Dec. 20, 1960    A. SENKOWSKI    2,965,181
TRACTOR DIFFERENTIAL GEAR LOCK-OUT DEVICE
Filed Feb. 3, 1954    12 Sheets-Sheet 1

INVENTOR
ALEXANDER SENKOWSKI
BY
Carlson, Pitzner, Hubbard & Wolfe
ATTORNEYS

Dec. 20, 1960 A. SENKOWSKI 2,965,181
TRACTOR DIFFERENTIAL GEAR LOCK-OUT DEVICE
Filed Feb. 3, 1954 12 Sheets-Sheet 3

INVENTOR
ALEXANDER SENKOWSKI
BY
Carlson, Pitner, Hubbard & Wolfe
ATTORNEYS

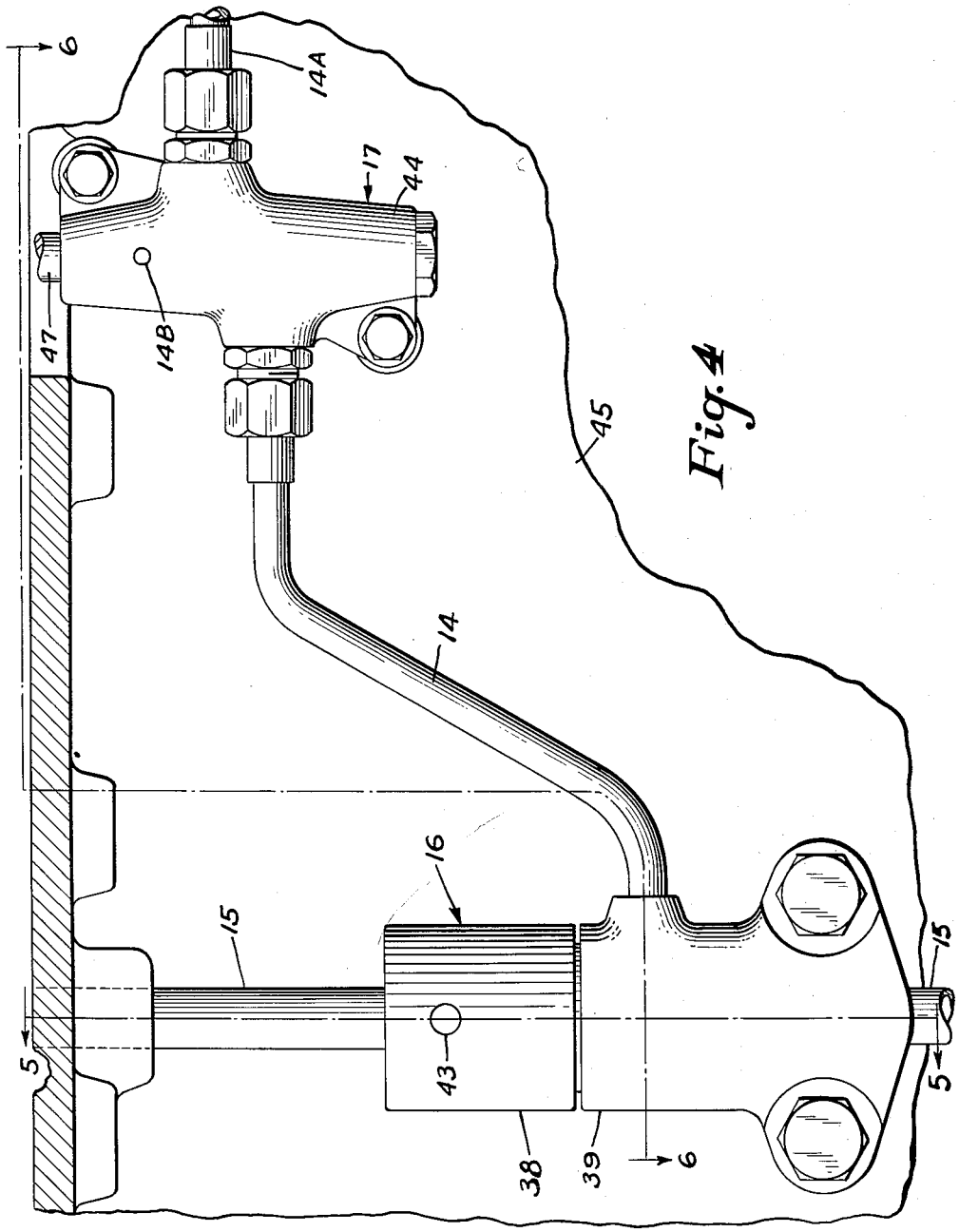

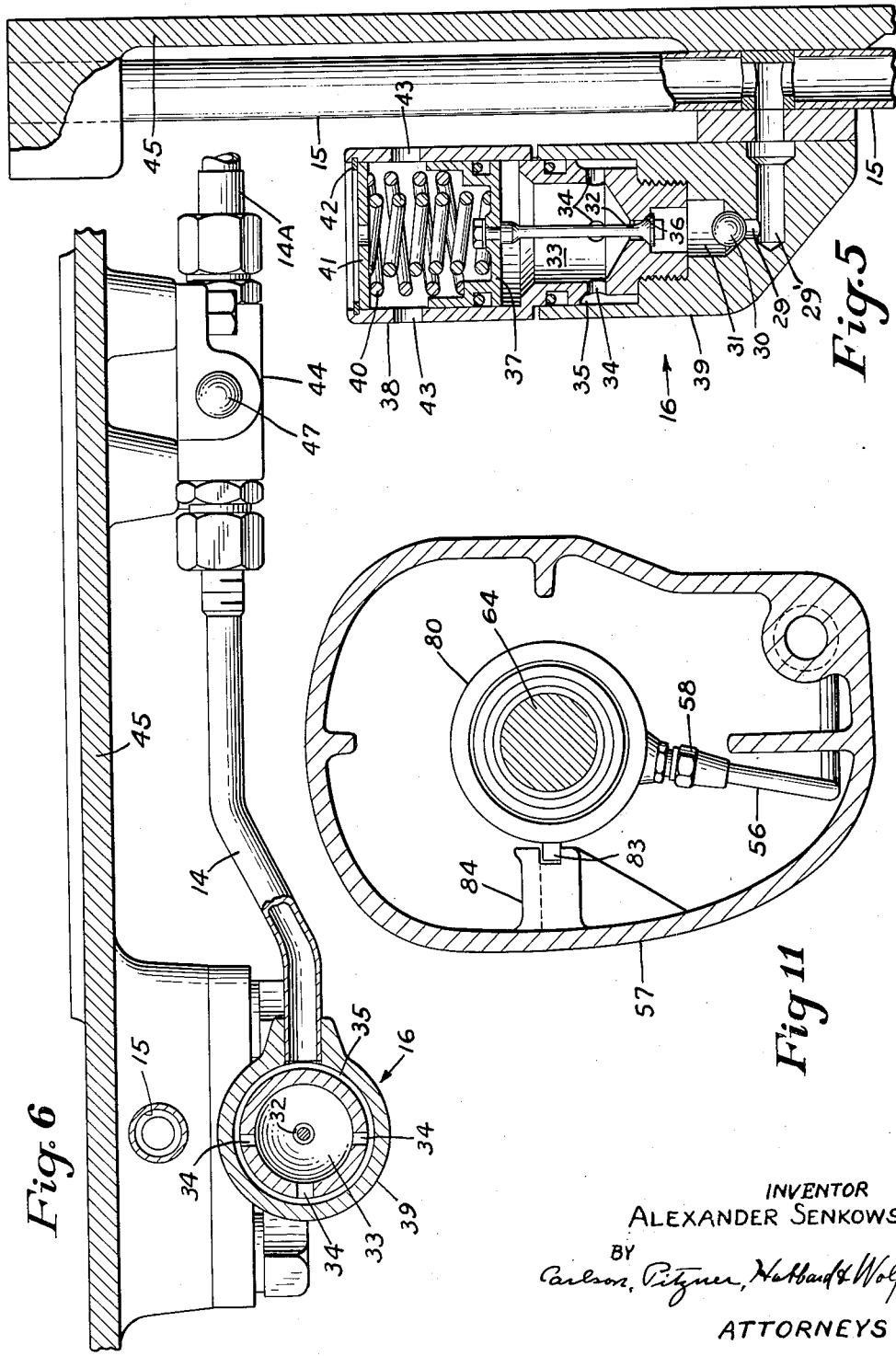

Dec. 20, 1960 A. SENKOWSKI 2,965,181
TRACTOR DIFFERENTIAL GEAR LOCK-OUT DEVICE
Filed Feb. 3, 1954 12 Sheets-Sheet 6

INVENTOR
ALEXANDER SENKOWSKI
BY
ATTORNEYS

Dec. 20, 1960 A. SENKOWSKI 2,965,181
TRACTOR DIFFERENTIAL GEAR LOCK-OUT DEVICE
Filed Feb. 3, 1954 12 Sheets-Sheet 7
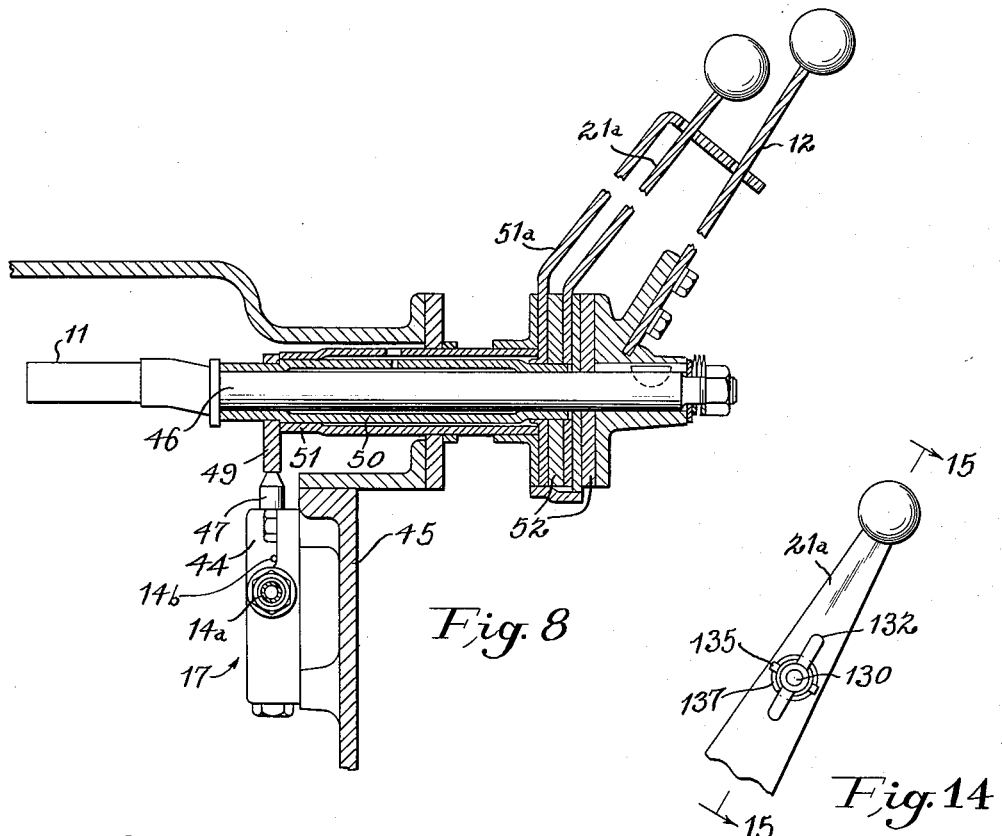
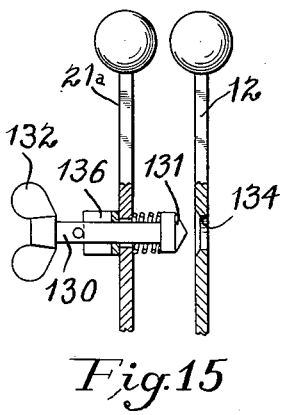
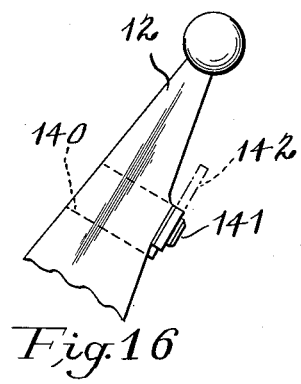
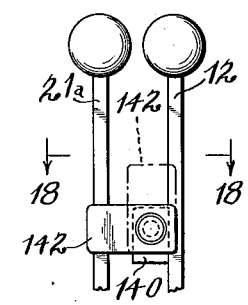
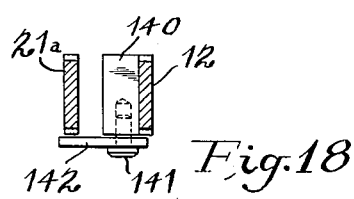
INVENTOR.
ALEXANDER SENKOWSKI
BY
Carlson, Pitzner, Hubbard & Wolfe
ATTYS.

INVENTOR
ALEXANDER SENKOWSKI.
by: *Carlson, Pitzner*
*Hubbard & Wolfe*
ATTORNEYS

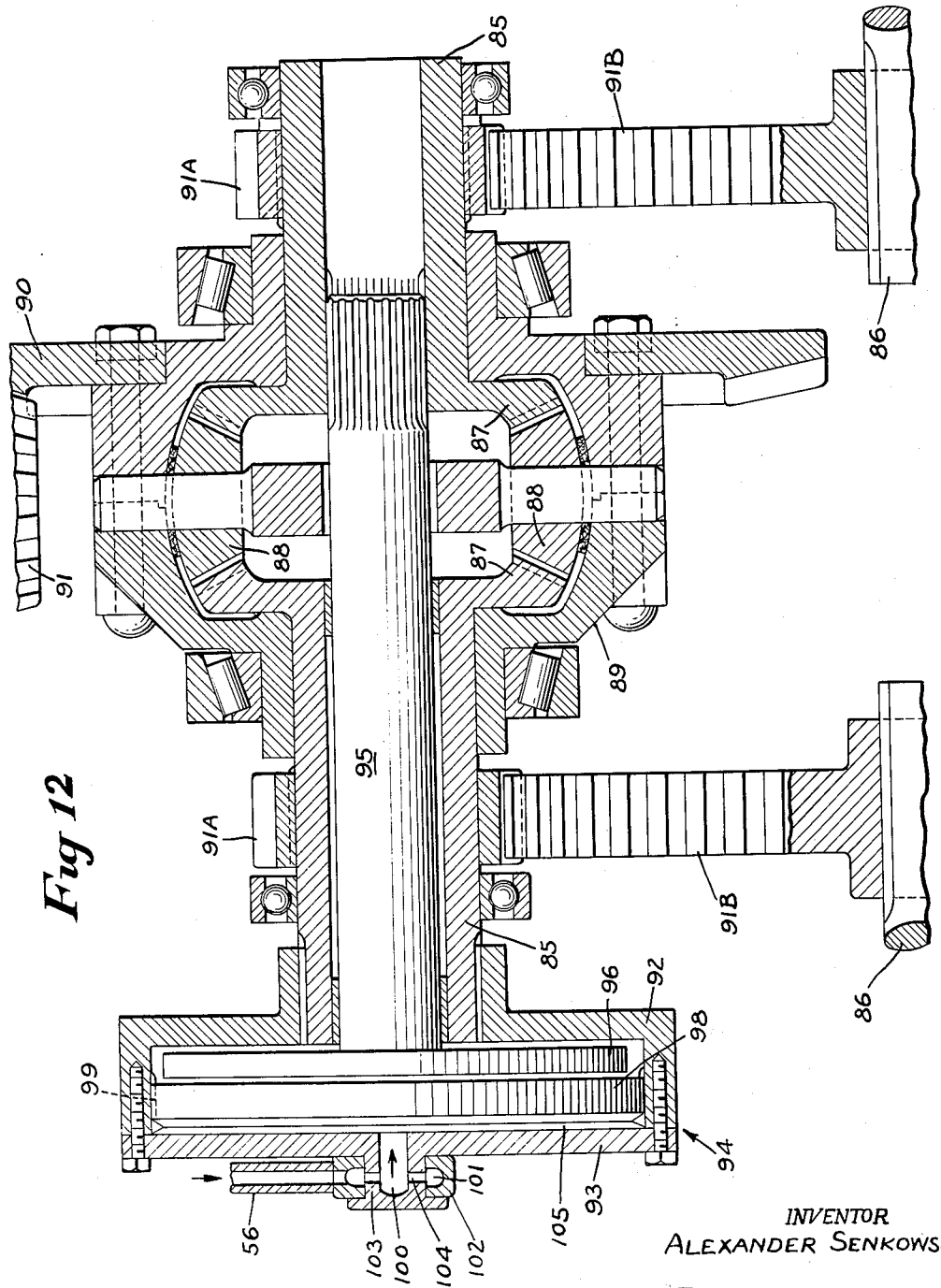

INVENTOR.
ALEXANDER SENKOWSKI

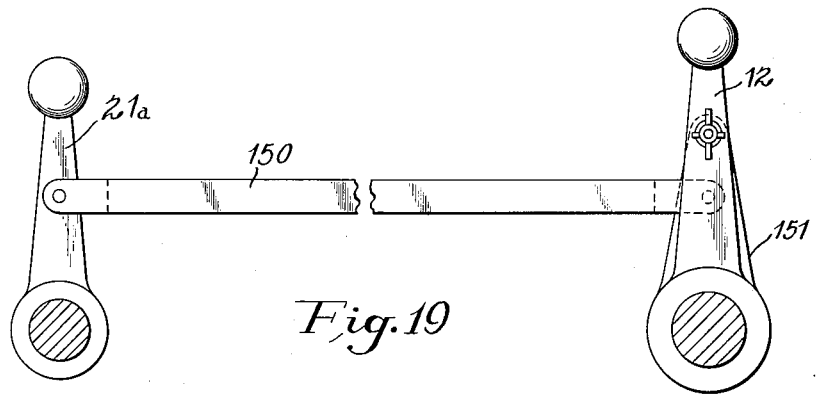
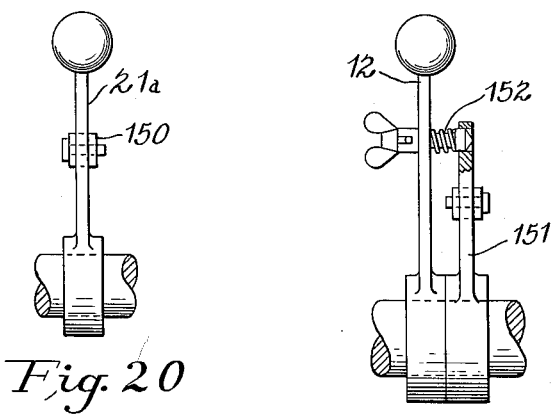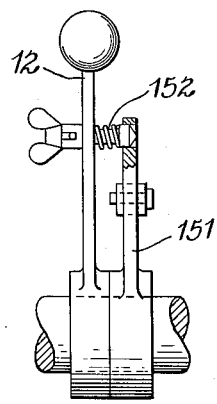
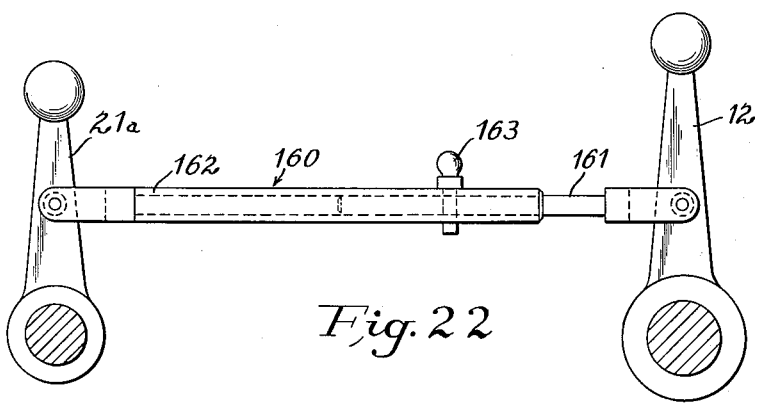

United States Patent Office

2,965,181
Patented Dec. 20, 1960

2,965,181

TRACTOR DIFFERENTIAL GEAR LOCK-OUT DEVICE

Alexander Senkowski, Earlsdon, Coventry, England, assignor to Massey-Harris-Ferguson (Sales) Limited, a British company Filed Feb. 3, 1954, Ser. No. 407,973

Claims priority, application Great Britain Mar. 3, 1948

19 Claims. (Cl. 172—3)

The present application is a continuation-in-part of applicant's previously copending application Serial No. 80,164, filed March 2, 1949, and now abondoned.

This invention relates to vehicle differential mechanisms of the standard type and also to differential mechanisms of the type wherein the differential cage and crown gear are mounted on co-axial layshafts which respectively drive the half shafts or axles through gearing. More especially the invention relates to differential mechanisms of tractors of the type that have a hydraulic implement control and hitch mechanism, including a main hydraulic actuator such as a piston and cylinder, for vertically moving the hitch and implement and supporting the weight thereof.

It is advantageous from the point of view of fuel and tire economy to be able to lock the driven wheels of the tractor together, that is, to put the differential mechanism out of action under some conditions, for example, when doing heavy work such as plowing. Differential locks employing positive engagement have been used, but these suffer from the disadvantages that the vehicle has to be stopped and gently started to allow engagement of the lock, and disengagement may be difficult so long as the engine is pulling and may therefore at least necessitate slowing down. Such disadvantages are especially serious in operations such as plowing wherein the tractor would have to be stopped before starting each furrow.

An object of the invention is to provide a locking mechanism which obviates or mitigates the above disadvantages.

A further object is to provide a new and improved lock for a differential drive assembly, in which use is made of a planet carrier in the assembly as a point of application of the lock.

Another object is the provision of a new and improved lock for a differential drive assembly in which the lock is applied to jackshafts or layshafts in the assembly.

Still another object is to provide a new and improved lock for a vehicle differential drive by the use of friction clutch elements, whereby the vehicle wheels may be locked to one another without stopping or slowing of the tractor and relative rotation of the vehicle wheels may take place under conditions of extreme overload.

A still further object is to provide a new and improved lock for a differential drive assembly in a tractor, which lock is operated by a hydraulic system on the tractor otherwise employed for elevation of an implement connected to the tractor. The lock may be actuated by fluid that is locked under pressure because of gravitational load imposed on the fluid by the implement when raised or draft load imposed on the implement when operating in the ground. The fluid may also be kept under pressure by an accumulator.

It is an additional object of the invention to provide for the operation of control members or levers for the implement hitch and differential lock means in unison in order that the differential is locked when the implement is lowered and unlocked when the implement is raised with but a single action on the part of the tractor operator. In this manner, the operator need not separately control the differential lock when plowing, for example. At the end of each furrow the differential is unlocked as an incident to raising the plow, thereby permitting the tractor to turn at the headlands. As the plow is lowered to begin the next furrow, the differential is automatically locked for the plowing operation.

Still another object is to provide for such movement in unison of hitch control and differential lock control levers by locating them in closely spaced co-axial relation so that they may be grasped as one and moved together, or they may be moved individually. As an alternative, it is an object to provide a positive mechanical coupling between such control levers, whether spaced axially on a common axis or located on spaced parallel axes, so that movement of one effects movement of the others, such mechanical coupling being disengageable to permit independent movement of the levers.

Further objects and advantages will become apparent as the following description proceeds, taken in connection with the accompanying drawings, in which:

Fig. 2A is a diagrammatic view of another modified power hitch and differential lock control system in which separate sources of pressure fluid are provided for the hydraulic hitch and differential lock actuators.

Fig. 4 is an enlarged elevation of the reducing valve.

Figs. 5 and 6 are respectively sectional views on the lines 5—5 and 6—6 of Fig. 4.

Figure 7:
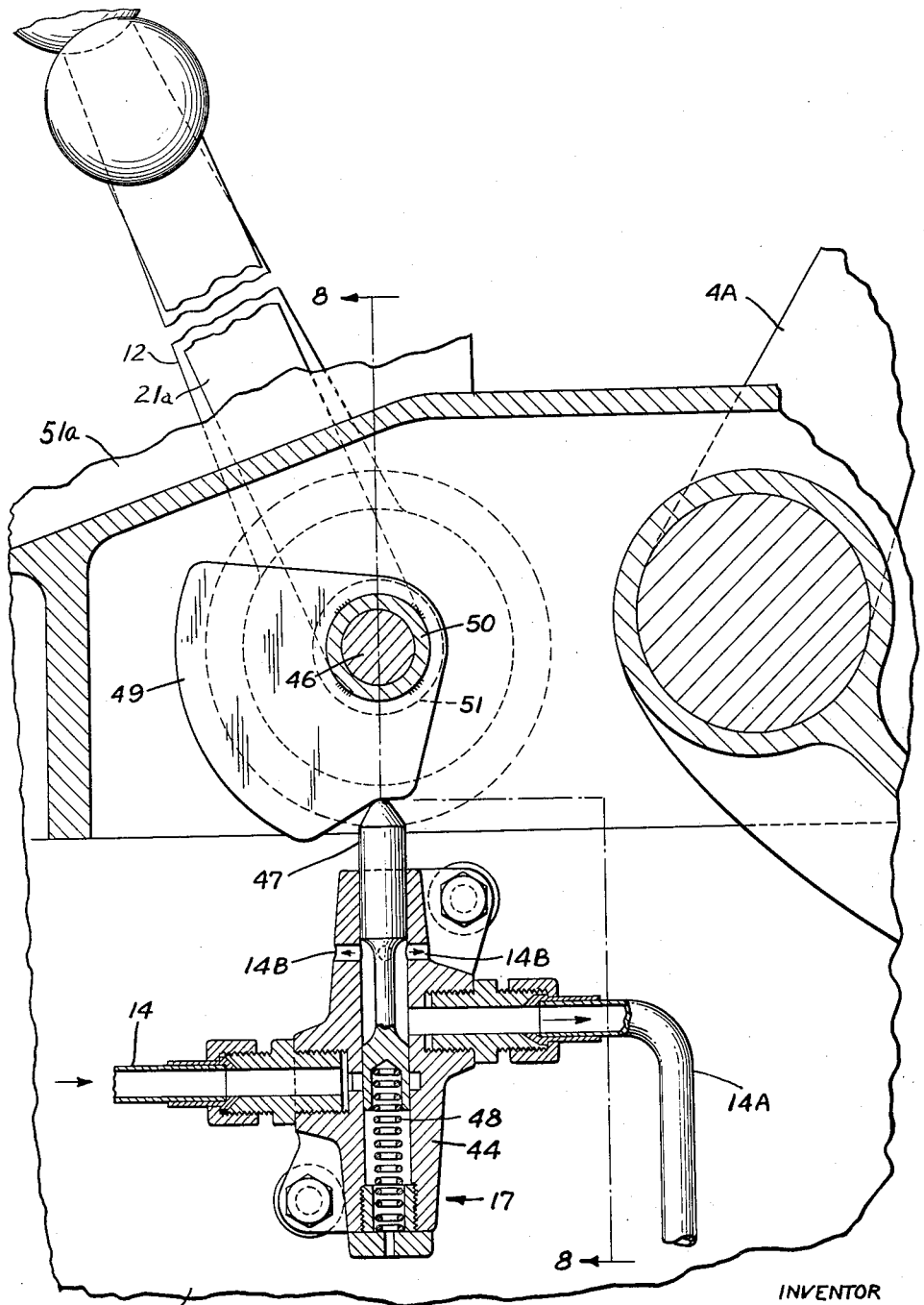

Fig. 7 is a sectional view to an enlarged scale of the differential lock control valve.

Fig. 8 is a sectional view on the line 8—8 of Fig. 7.

Figure 9:
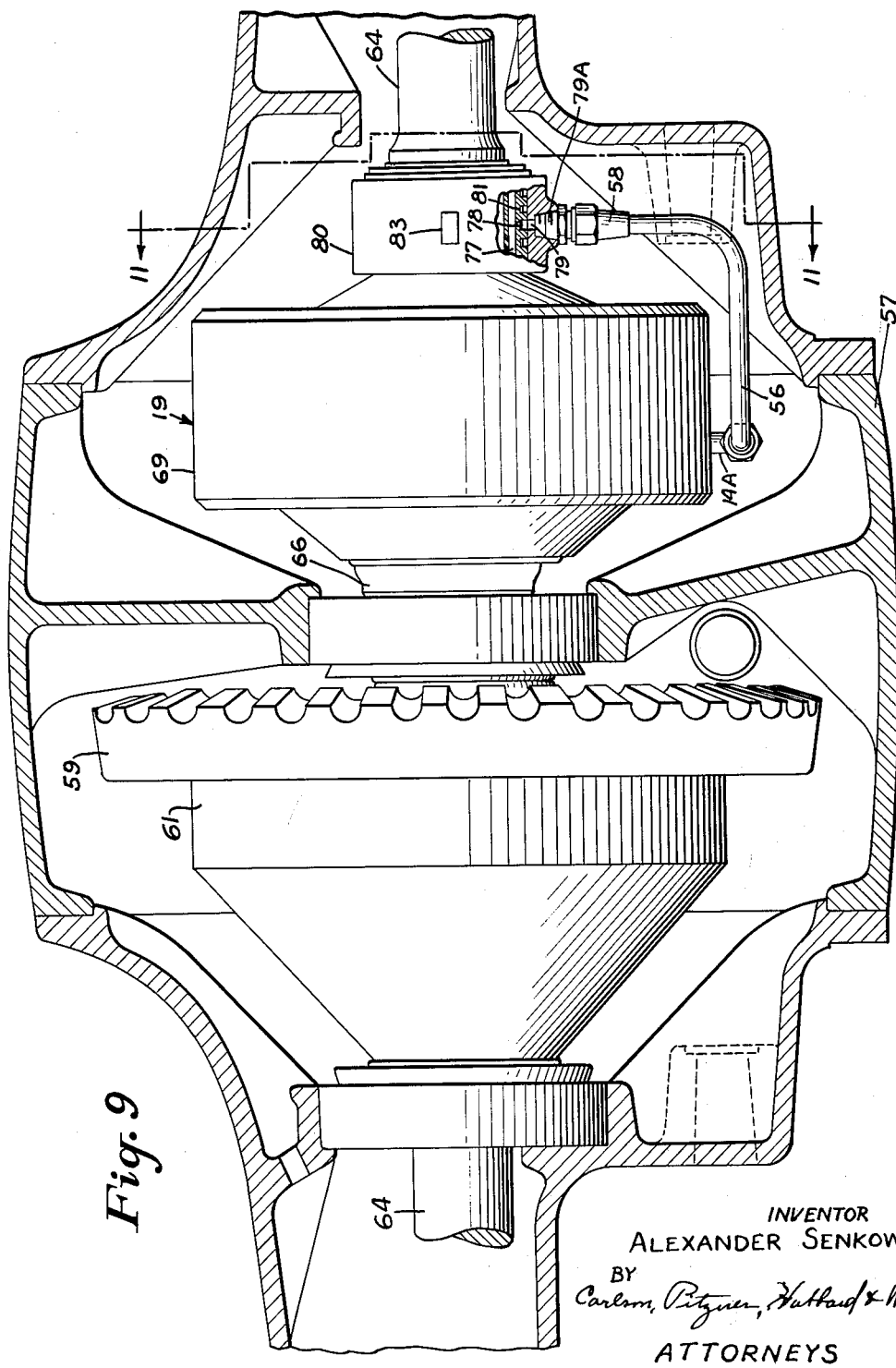

Fig. 9 is a sectional elevation through the differential housing along the axis of the half shafts.

Figure 10:
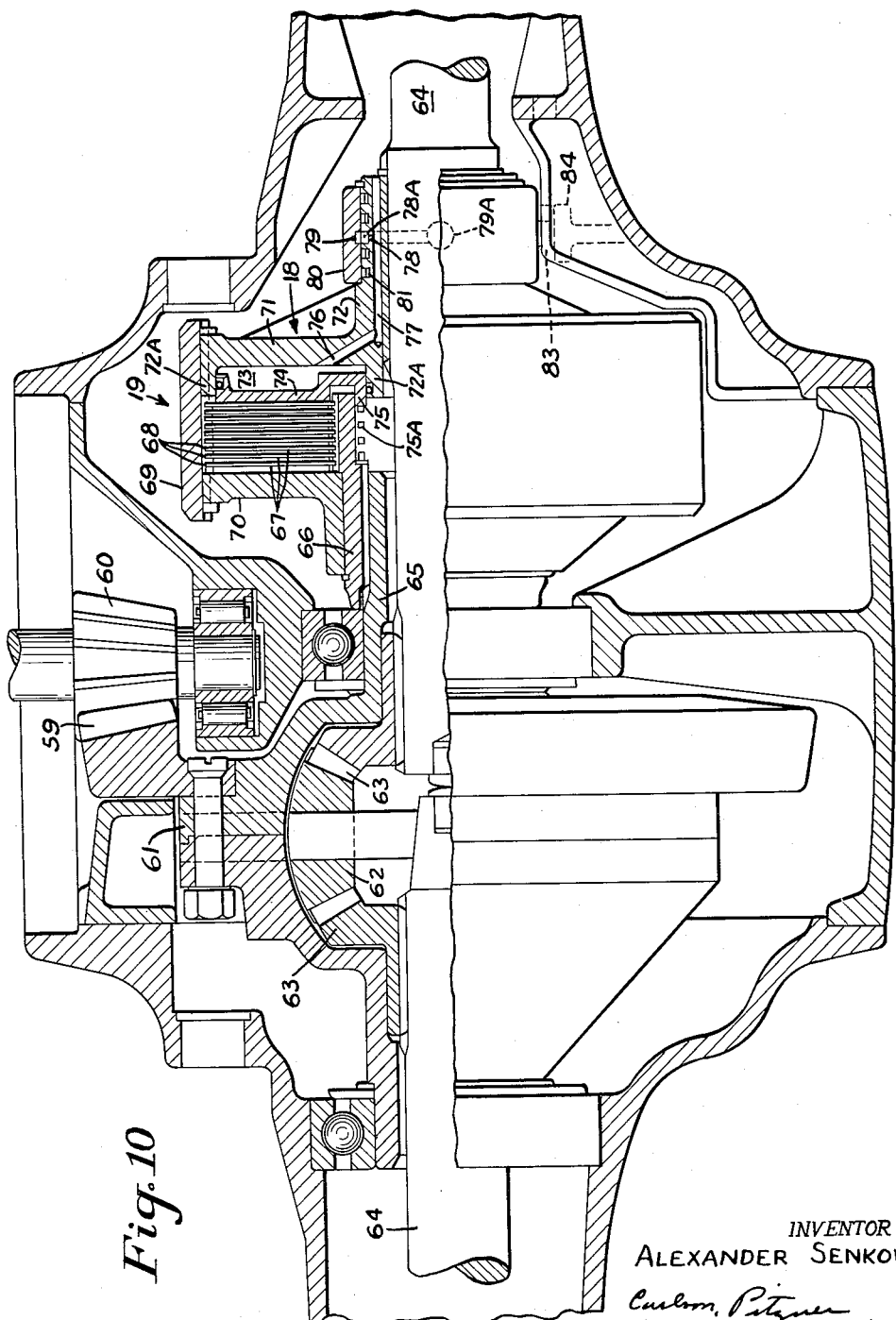

Fig. 10 is a part sectional plan view through the differential housing and lock clutch.

Fig. 11 is a sectional detail view on the line 11—11 of Fig. 9.

Fig. 12 is a sectional plan view of a layshaft type differential with the invention applied thereto.

Figure 13:
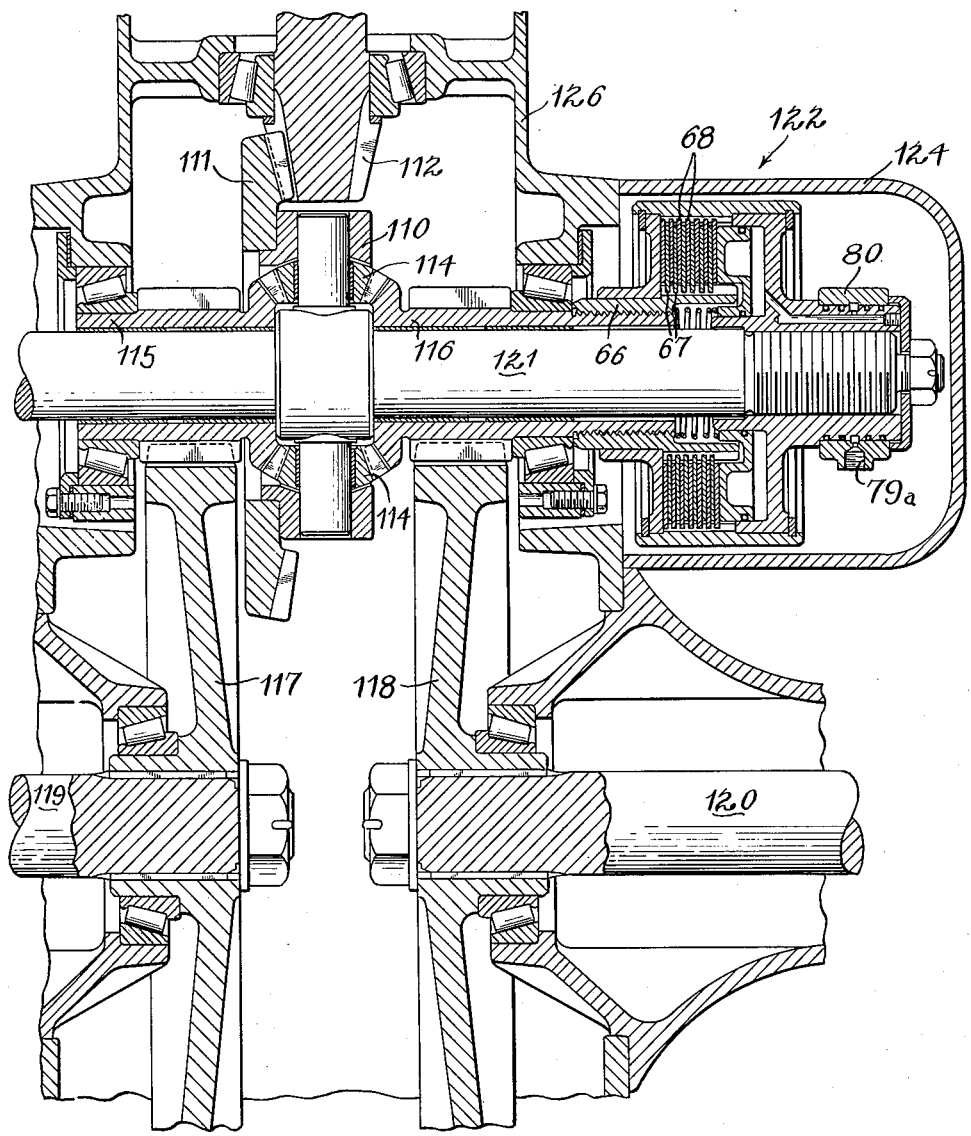

Fig. 13 is a horizontal section of still another arrangement of a differential drive assembly which, in accordance with the invention, is adapted to be selectively locked to stop differential action.

Figs. 14 and 15 are detail views of the co-axial, closely spaced hitch and differential lock control members which are adapted to be releasably coupled together for actuation in unison, Fig. 15 being taken in section substantially along the line 15—15 in Fig. 14.

Figs. 16, 17 and 18 are detail views of a modified, one-way connection between co-axial hitch and differential lock control members, Fig. 18 being in section taken substantially along the line 18—18 in Fig. 17.

Figs. 19, 20 and 21 are detail views of modified connecting means for operating hitch and differential lock control members in unison where such members are spaced apart on parallel axes. Figs. 20 and 21 are elevations taken from opposite ends of the means shown in Fig. 19.

Fig. 22 is a detail view of modified connecting means for control members spaced as shown in Fig. 19.

Although the invention is susceptible of various modifications and alternative constructions and uses, I have shown in the drawings and shall herein describe in detail preferred embodiments of the invention. It is to be understood, however, that I do not intend to limit the invention by such disclosure, but mean to cover all modifications and alternative constructions and uses falling within the spirit and scope of the invention as expressed in the appended claims.

Figure 1:
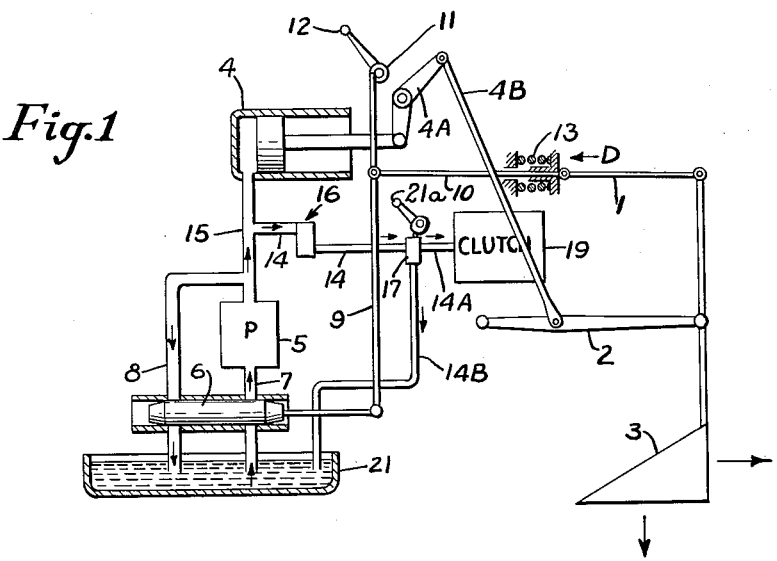
Fig. 1 is a diagrammatic view of the hydraulic power control system and hitch mechanism illustrating the system adaptation to control a differential lock.

The hydraulic power control and hitch mechanism shown diagrammatically in Fig. 1 is well known and operates substantially in the manner disclosed in Ferguson Patent No. 2,118,180, dated May 24, 1938. Briefly it comprises a hitch consisting of an upper link 1 and two lower laterally spaced links 2 which have their left ends as viewed in Fig. 1, universally attached to a tractor (not shown) and to which an implement, for example, a plow 3 is connected by universal joints. The links 2 and implement are adapted to be raised or lowered respectively by admission or release of oil to or from a main one-way hydraulic ram 4 connected to the links 2 through a cranked lever 4A and drop links 4B. Oil is supplied by a pump 5 driven from the tractor engine and controlled by a main piston control valve 6 which controls an admission port 7 on the suction side of the pump and a discharge port 8. In the position shown the valve puts the pump out of effective action by closing the suction port and traps the oil in the ram 4 to support the implement on the tractor, that is, the oil in the ram 4 is thereby pressurized by the weight of the implement. Movement of the valve 6 to the right or left respectively releases or admits oil to allow gravitational lowering or cause lifting of the implement.

The main valve is subject to manual and automatic control through a "floating" lever 9 pivotally connected to the valve 6 and to a member 10 connected to the top link 1. The top end of the lever bears against an eccentric 11 actuatable by a main control handle 12. Actuation of the handle 12 rocks the lever 9 to open or close the valve to admit or release oil, and when the implement has reached a position corresponding to the handle position, the member 10 has automatically moved to swing the lever 9 to restore the valve to the "neutral" or trapping position shown. The automatic control consists of the member 10 and link 1 which is subject to a compressive force D balanced by a spring 13 and arising from the rearward horizontal component of the soil forces on the plow when working. For instance, when the valve 6 is manually moved to the right to lower the implement into the soil, the spring 13 is compressed by the soil resistance and the member 10 is moved to the left and swings the lever 9 about its top end and moves the valve to the left so that it arrives at the neutral position when the plow is encountering a certain soil resistance corresponding to the setting of the hand lever. Variation in the soil resistance from the predetermined values causes further compression or extension of the balance spring 13 and the consequent movement causes swinging of the lever 9 to open or close the valve to raise or lower the implement until the force D, which depends, inter alia on the depth of the implement, has been restored to the predetermined value corresponding to the setting of the handle 12. The arrangement so far briefly described is well known and for the purpose of the present invention it must be especially noted that when the valve is in the position shown the pump is not available for supplying pressurized oil, but that the oil trapped in the actuator is pressurized by the weight of the links and the implement. It is also pressurized by the downward force or "suck" of the plow, that is, the downward force imposed on the plow as it cuts, lifts and turns the sod.

In accordance with the invention, a conduit 14 leads from the main actuator 4, or more exactly, from a conduit 15 connecting the pump and the main actuator, to a reducing and non-return valve 16 and thence to an auxiliary control valve 17 and thence through conduit 14A to an auxiliary piston and cylinder actuator 18 (Fig. 10) for actuating a friction clutch 19 to lock a differential drive assembly in a manner to be described. From the valve 17 an exhaust conduit 14B leads to a sump 21.

The auxiliary control valve is movable by a handle or lever 21A into a position to connect conduits 14 and 14A and close 14B and actuate the clutch or to connect 14A and 14B and exhaust the oil and allow the clutch to be disengaged by the spring.

Figure 2:
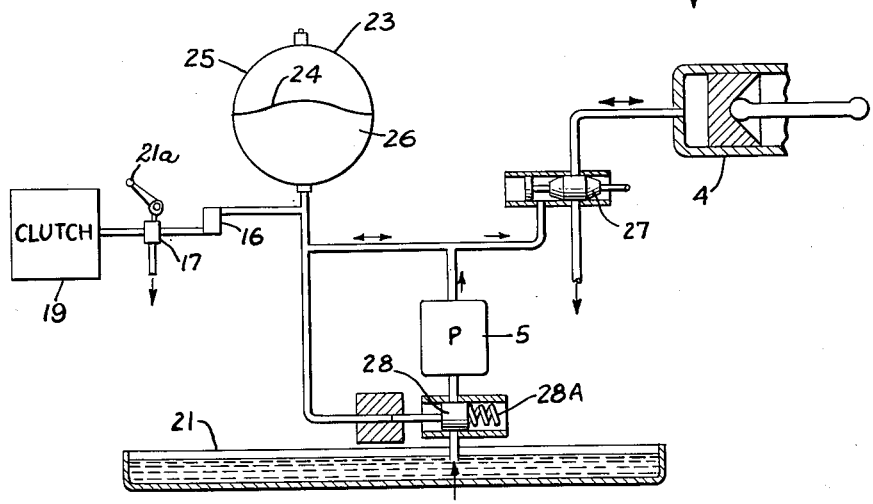
Fig. 2 is a diagrammatic view of a modified power hitch and differential lock control system.
Figure 2:
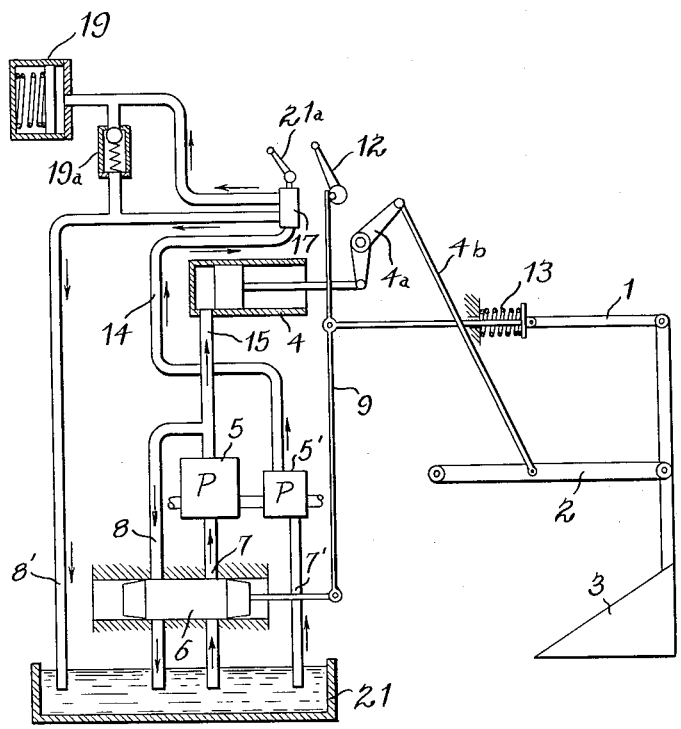

The arrangement shown in Fig. 2 represents a modified form of the tractor hydraulic system. In this arrangement a pressure accumulator is provided consisting of a vessel 23 separated by a flexible diaphragm 24 into an air chamber 25 and oil chamber 26. The accumulator maintains an instantly available supply of pressurized oil. This can be used for actuation of the auxiliary actuator even when the pump is not in effective operation and even if the oil in the main actuator 4 is not under load. The main control valve in this case is denoted by the numeral 27, and 28 is an admission control valve for the pump subject to the opposed influence of a spring 28A and the accumulator pressure. The main control valve is positionably controlled by a floating lever acted upon by a draft responsive member and quadrant lever as shown in Fig. 1 at 9, 10 and 11. It will also be understood that the main actuator 4 in Fig. 2 is connected as illustrated in Fig. 1 to control the elevation of draft link 2 through a crank lever 4A and drop links 4B. These latter elements have not been redrawn in Fig. 2 for the sake of simplicity and since the similarity of the systems will be obvious.

The second modified power system (Fig. 2A) for actuating and controlling the implement hitch and locking means is generally similar to that shown in Fig. 1. Corresponding parts in Fig. 2A have accordingly been identified by the same reference characters employed in Fig. 1.

The system of Fig. 2A differs primarily in that a separate source of fluid pressure is provided for operating the clutch 19. In this instance a separate low pressure hydraulic pump 5' is driven from the tractor engine, preferably by the same shaft which drives the main pump 5. No conduit connection is made from the main pump 5 and the main actuator 4 to the clutch 19 and control valve 17. Rather, the low pressure pump 5' has an intake conduit 7' from the sump 21 and an outlet conduit 14' leading to the control valve 17, no pressure reducing valve being necessary. Opening and closing the valve 17 vents or supplies pressurized oil from or to the clutch 19, oil being returned to the sump 21 via a conduit 8'. Preferably, a safety valve, here shown as a spring-biased ball valve 19A is provided to relieve any excessive pressure which might arise in the clutch 19. Normally, this safety valve is closed, however.

Reference is now directed to Figs. 3 to 11 which show in more detail the hydraulic differential lock referred to above. As shown more clearly in Figs. 3, 4, 5 and 6, the reducing valve 16 is connected by way of a passage 29' to the pipe 15 which supplies oil from the pump 5 to the main actuator 4, a valve inlet 29 being controlled by a non-return ball valve 30 at the foot of a high pressure chamber 31 which connects by a small throat 32 with a low pressure chamber 33 communicating by ports 34 with an annular space 35 to which is connected the conduit 14 leading to the auxiliary control valve 17. Control of the throat 32 is effected by a small conical valve 36 connected to a relatively large diameter plunger 37 in the low pressure chamber 33 which is constituted by an upper body part 38 and a lower body part 39, into which part 38 is screwed. The plunger is urged downwards to open the valve 36 by springs 40, being opposed by the oil pressures in the chambers. The springs 40 butt against the plate 41 retained in the body part 38 by a ring 42 and air vent holes 43 are provided in the part 38 and plate 41. The arrangement is such that the total oil pressure on the valve and piston is such as to overcome the springs 40 and close the valve to prevent the pressure in the low pressure side from exceeding 100 to 120 lbs. per square inch, the pressure on the high pressure side ranging up to the limit set by a safety "blow off" valve normally incorporated. The limit may be 1500 or 2000 lbs. per square inch. The diameter of the plunger 37 so exceeds that of the throat that the plunger provides by far the major part of the spring-overcoming force. Therefore, the maximum limit on the low pressure side does not greatly vary with the variations which take place in the high pressure side due to the fact that in the arrangement shown in Fig. 1 the pressure on the high pressure side or main actuator arises from the load on the hitch links.

As shown more clearly in Figs. 3, 7, and 8 the pipe 14 leads to the auxiliary control valve 17 which consists of a valve casing 44 which is attached inside a transmission casing 45 just below the shaft 46 which carries the main control handle 12 and eccentric 11. Inside the casing is a valve 47 with reduced central region urged upwardly by spring 48 and having a nose contacting cam plate 49 which is attached to one end of a sleeve 50 rotatable on the shaft 46 and in a bearing sleeve 51. At its other end the sleeve 50 has the auxiliary actuating handle 21A attached thereon, this handle thus being coaxially and closely spaced from the main handle 12. In the position shown in Figs. 3 and 7, admission of oil from the conduit 14 is cut off and the conduit 14A leading to the clutch actuator is in communication with the exhaust ports or conduit 14B. If the handle 21A is rotated to the left in Fig. 3 the valve 47 is held down against the spring to close the exhaust ports 14B and connect the conduits 14 and 14A to actuate the differential locking means presently to be described.

Figure 3:
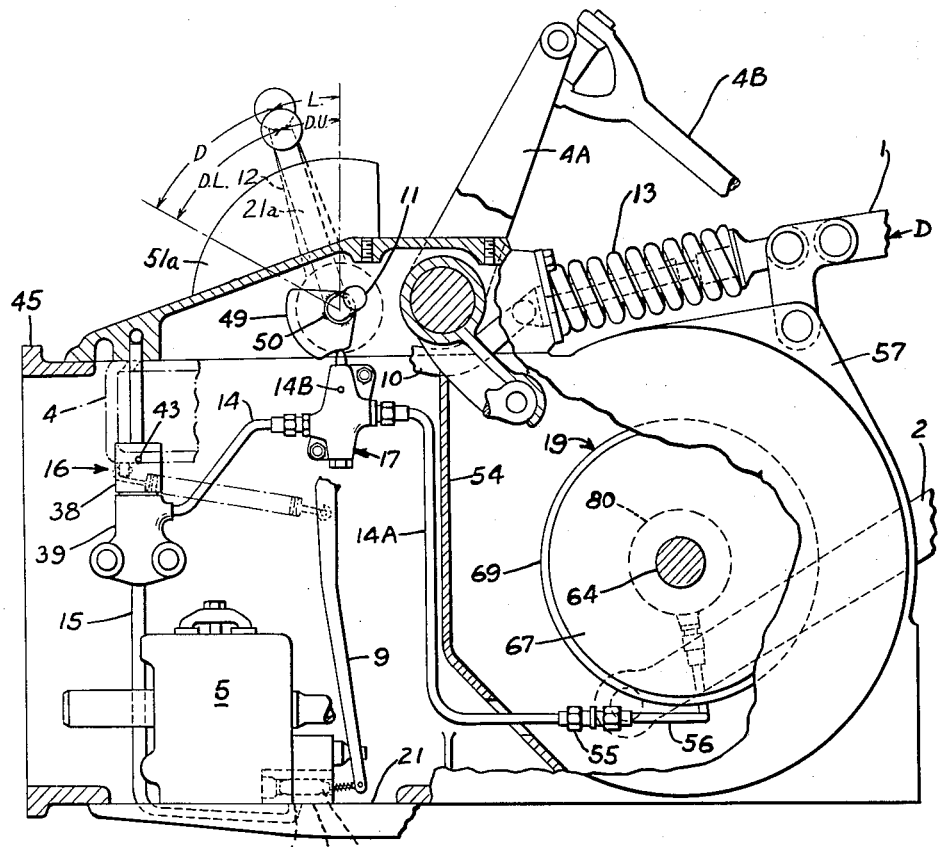
Fig. 3 is a view through a tractor transmission casing and differential housing of the tractor rear axle, partly in section and with parts removed.

As indicated more particularly in Figs. 3 and 8, the control members or handles 12 and 21A are arranged to be rocked about the same axis and are so closely spaced along such axis that it is convenient for the tractor driver to grasp them both at once with one hand and move them in unison. Both of the handles work in a slotted quadrant guide 51A supported by the bearing sleeve 51, friction pads 52 being engaged by the handles to retain them in a selected position.

The handles 12 and 21A are adapted to be moved between corresponding first and second positions such that while in their first positions the hitch is lifted and the differential locking means are released, and while in their second positions the implement hitch is lowered and the locking means are engaged. In Fig. 3 coextensive arcuate ranges of travel of the two control handles are diagrammatically indicated. The overall movement of the hitch control handle 12 is subtended by the arcs D and L, there being a slight intermediate "neutral" arc. When the handle or lever 12 is in the arc L, the valve 6 (Figs. 1 and 2A) or 27 (Fig. 2) is positioned to open the intake port 7 and thus effecting lifting of the hitch and the implement; when the lever 12 is in the arc D, the hitch valve is positioned to open the exhaust port 8 thus allowing the implement on the hitch to drop to working position. In the "neutral" arc (as here illustrated) the handle 12 positions the hitch valve to close both intake and exhaust ports 7 and 8, thus trapping fluid in the hitch actuator 4.

The differential lock control member or handle 21A is movable along the successive arcs DU and DL which correspond to the arcs L and D. The cam plate 49 is "phased" on the sleeve 50 such that its cutaway section is opposite the valve 47 when the handle 21A is in the arc DU, thereby venting the differential lock actuator through the passage 14B. On the other hand, when the handle 21A is in the arc DL, then the section of greatest radius on the cam plate shifts the valve 47 downwardly to connect the conduits 14 and 14A and thereby engage the differential locking means.

Since the handles 12 and 21A may be conveniently moved in unison between the matching positions L, DU and D, DL the tractor driver may operate both the hitch and the locking means with a single movement. When plowing, for example, at the end of a furrow the driver need simply grasp both handles 12 and 21A and shift them simultaneously to the L and DU positions, thus lifting the implement and unlocking the differential to permit easy turning of the tractor at the headland. By the same token, when the next furrow is to be started, the handles may both be shifted with one hand to the D and DL positions to drop the plow into working position and lock the differential. Yet, whenever desired the handles 12 and 21A may be individually shifted to either position.

As shown in Figs. 3 and 11, the conduit 14A passes down alongside and through a rear partition 54 of the transmission casing and is connected by a screwed union joint 55 to a conduit 56 which is bent to project out of a differential housing 57 and then bent up to make connection through a connector 58 with the clutch.

As shown in Figs. 9 and 10, there is a differential drive assembly that is distinctive in that a crown gear 59, secured to a carrier 61, faces outward thereof and so is displaced from a conventional central position thereon, to make room for the clutch 19. The crown gear 59 is driven from a transmission bevel gear 60. The planet carrier 61 carries four planet bevel gears 62 engaging the bevel gears 63 secured to the respective axles 64 which drive the rear ground wheels of the tractor.

In accordance with the present invention the carrier 61 is extended in the form of a sleeve 65 which has connection with one element of the clutch. This connection consists of a stepped ring 66 keyed to the sleeve 65 and having a pack of thin annular clutch plates 67 which are feathered to the ring for axial sliding movement and for rotation therewith and which form said clutch element. The complementary clutch element consists of a pack of similar clutch plates 68 which intermesh with the first pack and have a similar feathered connection with the peripheral wall 69 of an annular casing otherwise consisting of an inner annular end wall 70 rotatable on the ring 66 and an outer end wall 71 having a sleeve extension 72 keyed to one axle 64. This latter wall 71 has inward flanges 72A, which in effect form a shallow annular cylinder 73 containing an annular clutch-actuating piston 74 which engages the end friction plate and which has an extension 75 embracing the ring 66 and engaging a spring 75A, which butts against the step of the ring 66 and normally holds the piston 74 and consequently the clutch out of action. Radial inclined passages 76 connect the cylinder with an annularly arranged series of bores or passages 77 in the extension 72, which passages communicate by a series of radial ports 78 and an outer peripheral groove 78A with a passage 79 in a collar 80. The sleeve 72 rotates within the collar 80 and is sealed with respect to the collar by a plurality of packing rings 81. This arrangement allows rotation of the sleeve 72 in the collar 80 with continuous oil connection between the pipe 56 and the cylinder 73, connection between the collar 80 and pipe 56 being effected by union coupling 58 (Fig. 9) at passage 79. To prevent stress on this coupling the collar is also anchored against rotation by an extension 83 attached to the internal bracket 84 of the casing.

It will be evident that when oil is admitted to the cylinder 73 the piston will compress the two packs of discs and so lock together the one axle 64 and the planet carrier 61 and put the differential out of action.

Fig. 12 shows a layshaft or jackshaft type of differential in which layshafts 85 are interposed between tractor axles 86 and driven bevel gears 87 meshing with planet gears 88 mounted on carrier 89, which is driven by a crown gear 90 secured thereto and a bevel gear 91 connected with the output side of the tractor transmission. The bevel gears 87 may be integral with the layshafts 85. Reduction gears 91A and 91B drivingly connect the layshafts and the tractor axles. A distinctive feature is that the layshafts 88, are of hollow construction and one is extended in length. Rigidly mounted at the outer end of the longer layshaft is a drum 92 which is closed by a cover plate 93 at its outer end to form a shallow cylinder 94. An extension shaft 95 is rotatably mounted inside the longer layshaft and its inner end extends into the other layshaft, with which it has a slidable, drive-transmitting splined connection. To the outer end of the shaft 95 is rigidly secured a friction pate 96 which is located in the cylinder 94. Inside the cylinder to the outer side of the friction plate there is a shallow piston 98 which has grooved peripheral connections 99 with the cylinder 94 so as to rotate therewith.

Oil is conducted to the cylinder 94 by the conduit 56 which connects with a central aperture 100 in the cover plate 93. It will thus be apparent that the locking differential assembly shown by Fig. 12 may be employed on a tractor and supplied with pressure fluid through the conduit 56 just as in the case of the differential assembly illustrated in Figs. 9 and 10. To allow relative rotation between the conduit 56 and plate 93 the conduit 56 may connect with an annular chamber 101 in a member 102 within which rotates in oil-tight fashion a hollow projection 103 which communicates via the aperture 100 with the inside of the plate and has radial ports 104 connecting with the annular chamber 101. To prevent possibility of leakage of oil into the friction plate, the oil is confined to a suitable expansible sac 105 located in the cylinder, and suitable packing means may be provided to prevent oil from the differential passing along the shaft to the friction disc.

When oil is supplied under pressure the piston 98 clamps the friction plate 97 between it and the cylinder inner wall and thus frictionally locks together both driven ground wheels.

Turning now to Fig. 13, there is illustrated still another arrangement for a differential drive assembly adapted to be selectively locked against differential action by a hydraulically actuated clutch. Briefly, this form includes a multiple plate clutch and actuator of the type shown in Fig. 10, but applied between one layshaft and a connection shaft from the other layshaft in a differential assembly of the type shown in Fig. 12. The differential drive assembly of Fig. 13 may be locked by controlling the supply of pressure fluid to the port 79a through the conduit 56 as shown in Figs. 9 and 10. It will thus be readily apparent how the assembly of Fig. 13 may be employed in lieu of the assemblies shown respectively by Figs. 10 or 12.

It may be observed that the differential drive assembly is of the layshaft type and that it includes a planet carrier 110 having fixed thereon a crown or ring gear 111 meshed with a bevel pinion 112 adapted to be powered from the tractor engine (not shown). The carrier has planet gears 114 journaled on its which are meshed with bevel gears here shown as integral on the inner ends of coaxial, oppositely extending hollow layshafts 115 and 116. During normal operation, therefore, the layshafts are differentially driven and similarly drive, through spur gears 117 and 118, respective drive axles 119 and 120, the latter extending to the rear wheels (not shown) of the tractor.

In order to selectively lock the assembly against differential action, a connection shaft 121 is fixed within the one layshaft 115 and rotatably extends through the carrier 110 and the other layshaft 116. A multiple plate friction clutch 122 is interposed between the outer ends of the layshaft 116 and the connection shaft 121, such clutch being, in this instance, substantially similar to the clutch 19 shown in Fig. 10. However, in the arrangement of Fig. 13, the clutch 122 is enclosed in a separate removable casing 124, thereby rendering it conveniently accessible for removal, adjustment or repair. Inasmuch as the details of construction of the clutch 122 are the same as those previously described in connection with the clutch 19 in Fig. 10, further description is deemed unnecessary. It is sufficient to note that the ring 66 is fixed to the layshaft 116 and rotatably supports the annular wall 70 while at the same time carrying the first set of clutch plates 67 in non-rotatable relation. The second set of interleaved clutch plates 68 are feathered in the annular wall 69 fixed to the end wall 71 which rotates with the connection shaft 121. Pressurized fluid supplied through the opening 79A in the stationary ring 80 passes through the bores 77 and pushes the piston member 74 to the left against the bias of the spring 75A, thereby frictionally engaging the plates 67 and 68. The layshafts 115 and 116 are thus locked together through the connection shaft 121, and differential action is stopped.

Since the clutch engagement in the embodiments above described is frictional the tractor driving wheels can be locked and unlocked without stopping or slowing down the tractor, that is, while the tractor is in motion and the engine is pulling. A further advantage of the frictional lock is that it will yield to permit relative rotation of the wheels in conditions of extreme overload.

By providing clutch-actuating pistons of substantial diameters as shown which require only the relatively low pressure of 100 to 120 lbs. per square inch it is assured that there is always a sufficient pressure in the main actuator when an implement or other load is being carried, it being evident, of course, that in the arrangement of Fig. 2 there is available a pressurized oil supply independent of the loading on the main actuator.

In the arrangements shown only a small amount of clutch-actuating piston movement is necessary to engage the clutch and consequently only a small amount of oil is moved. The withdrawal of this oil from the main actuator will tend to cause a slight lowering of the hitch and implement but this will be corrected by the automatic depth control.

As mentioned above, the invention contemplates the provision of control means for the implement hitch and the differential lock means so arranged that the latter two may be actuated simultaneously and with but a single movement on the part of the tractor driver. In addition to the adjacent locations of the two control levers previously described, a positive mechanical coupling may be provided between the levers, such coupling preferably being releasable at the will of the operator in order that the handles or levers may be independently moved.

Referring now to Figs. 14 and 15, one form of such positive coupling for the side-by-side coaxial control members 12 and 21A is there illustrated. It comprises a spring-biased detent 130 having a conical head 131 and a fingerpiece 132. The detent is mounted in transversely extending relation in one of the control members and its head 131 is adapted to enter a flared hole 134 in the other control member. When the detent 130 is thus engaged, the two members 12 and 21A may be moved as one, considerably reducing the driver's manipulations, for example in plowing as previously described. The coupling may be released, however, to permit individual operation of the members simply by grasping the fingerpiece to withdraw a cross pin 135 on the detent clear of axial slots 136 in a sleeve 137, and then rotating the detent so that the cross pin rests on the top of the sleeve as shown in Fig. 15. It will be apparent that this coupling arrangement may be added to the levers 12 and 21A shown in Fig. 8, the construction and operation of the several components otherwise being the same.

A modified form of such a coupling for the control members 12 and 21A is illustrated in Figs. 16, 17 and 18. In this embodiment, the coupling is intended to have one-way action, that is to assure that the differential lock means are released whenever the implement hitch is lifted. In carrying out this objective, a mounting block 140 is welded or otherwise secured to the hitch control member 21A, such block being tapped to receive a bolt 141 pivotally carrying an abutment plate 142. The plate 142 may be optionally oriented in vertical or horizontal positions by loosening and retightening the bolt 141. In the vertical position it clears the adjacent differential lock control member 21A; but in the horizontal position it abuts the member 21A and pushes it into the DU arc whenever the member 12 is moved into the L arc (Fig. 3). By this latter arrangement, therefore, the differential lock is always released when the implement hitch is lifted, although hitch may be lowered without locking the differential, as when plowing soft soil to a shallow depth and locking is not necessary. Here again, it will be clear that such coupling may be made between the levers shown in Fig. 8, the operation of the other components otherwise being the same.

Referring next to Figs. 19, 20 and 21, another modified coupling is there shown for use with the control members or levers 12 and 21A when the latter are not co-axially spaced but rather mounted for movement about spaced parallel axes. It will be obvious to those skilled in the art that, instead of being coaxial, the hitch and differential lock control levers 12 and 21A, as well as their respective shafts 46 and 50 as shown in Fig. 8, may be separated or physically spaced. The arrangement of the entire system would otherwise be the same as previously described. In this form, an elongated link 150 is pivotally connected between one of the levers (here the lever 21A) and an arm 151 adjacent to and fast on the mounting shaft of the other lever (here the lever 12). The arm and the adjacent lever are adapted to be removably connected together, as for example by a spring-biased detent 152 similar to the detent in Fig. 15, so that the two levers 12 and 21A may be moved in unison as one.

Still another form of coupling is illustrated in Fig. 22 for use with non-coaxially spaced control members 12 and 21A. As here shown, the two members pivotally receive the opposite extremities of a telescoping link 160 having the interfitting parts 161 and 162. When joint control of the members 12 and 21A is desired, a locking bolt 163 is engaged to prevent telescoping of the parts 161 and 162, and with the link 160 thus rigid, the members are moved in unison. When the members 12 and 21A are to be moved independently, the locking bolt 163 is removed, and since the parts 161 and 162 then slide freely relative to one another, rotation of one control member does not affect the other.

While the coupling means for the hitch and differential lock control members have been described in connection with the levers 12 and 12A of the system shown in Figs. 1 and 3, it is to be understood that the practice of the invention embraces the joint control of such members whether they be included in systems of the type exemplified by Figs. 1, 2 or 2A. As explained previously, such joint control is a great convenience and materially reduces the manipulation of the tractor driver in plowing as he ends one furrow and must turn to begin the next.

I claim as my invention:

1. In a tractor having an implement hitch, a main hydraulic actuator for moving the hitch and implement vertically and for supporting the weight of the same, a source of pressure fluid, conduit means connecting said source with said actuator, and a differential drive assembly for the tractor drive wheels including a carrier adapted to be rotatably driven from the tractor engine, a pair of alined drive members rotatable about a common axis with said carrier, a planet gear rotatably mounted on said carrier, and gears fixed on the respective drive members and meshing with said planet gear, the combination comprising locking mechanism operative to stop the differential action of said drive assembly, an auxiliary pressure fluid operated actuator for operating said locking mechanism, and conduit means connecting said auxiliary actuator with the conduit means connecting to the main hydraulic actuator of the tractor, said auxiliary actuator being operable by the pressure created in the main actuator by the load sustained thereby.

2. In a tractor having an implement hitch, a main hydraulic actuator for moving the hitch and implement vertically and supporting the weight of the same, a source of pressure fluid, conduit means connecting said source with said actuator, and a differential drive assembly for the tractor drive wheels including a carrier adapted to be rotatably driven from the tractor engine, a pair of alined drive members rotatable about a common axis with said carrier, a planet gear rotatably mounted on said carrier, and gears fixed on the respective drive members meshing with said planet gear, the combination comprising locking mechanism operative to stop the differential action of said drive assembly, an auxiliary pressure fluid operated actuator for operating said locking mechanism, conduit means connecting said auxiliary actuator with the conduit means connecting to the main hydraulic actuator of the tractor, and a pressure reducing valve interposed in said last mentioned conduit means between said auxiliary actuator and the main actuator, said auxiliary actuator being operable at a pressure substantially below that normally prevailing in the main actuator.

3. The combination defined in claim 1 wherein the differential locking mechanism comprises cooperating clutch elements drivingly connected with the respective drive members and the auxiliary actuator is adapted to shift one of the elements into engagement with the other element to operate the mechanism.

4. The combination defined in claim 1 wherein the differential locking mechanism comprises a pair of cooperating clutch elements respectively fixed to one of the drive members and to the planet carrier and wherein the auxiliary actuator is adapted to operate the mechanism by engaging the clutch elements.

5. In the combination specified in claim 1, a reducing valve interposed between the main and auxiliary actuators comprising a member controlling a small inlet to a low-pressure chamber, means urging the member to open position, and a piston subject to the pressure of said chamber for urging the valve to closed position, the area of the chamber being substantially greater than the inlet.

6. In a tractor having a pair of rear traction wheels driven through a differential and a hydraulically elevated implement hitch through which load is transferred from the implement to such traction wheels through a body of fluid in an actuator for such hitch, the combination with said differential and hitch mechanism, of means for locking said differential to compel rotation of the traction wheels in unison, together with an auxiliary actuator for said locking means supplied with operating fluid pressurized in said first mentioned actuator by the load on said hitch.

7. In a tractor having an implement hitch, a main hydraulic actuator for elevating the same and a source of pressurized fluid for the actuator, a differential drive assembly for the tractor drive wheels comprising a planet gear, a pair of alined axles drivingly connected by gears with and extending in opposite directions from the planet gear, and a carrier for the planet gear driven from the tractor engine: the combination of a lock for the differential drive comprising an annular casing surrounding and fixed to one axle, clutch elements positioned in the casing, one clutch element being connected to the said casing, an extension sleeve connecting the planet carrier and the other clutch element, an auxiliary actuator comprising a piston member slidable in said casing to force said clutch elements into frictional engagement, and conduit means connecting said casing to the main actuator, said piston being operable by the fluid pressure created in the main actuator by the load sustained on said hitch.

8. The combination set forth in claim 7 further characterized in that said piston member is annular in shape and is constrained to rotate with but has freedom to shift axially relative to said casing.

9. The combination set forth in claim 7 further characterized in that said piston member is annular in shape and constrained to rotate with but has freedom to shift axially relative to said casing, and said clutch elements are formed of intermeshing packs of friction discs adapted to be clamped together by said piston member, the combination further comprising a spring tending to disengage said clutch elements.

10. In a tractor having an implement hitch, a main hydraulic actuator for moving the hitch and implement vertically and for supporting the weight of the same, a source of pressure fluid, conduit means connecting said source with said actuator, a first manual control member shiftable to cause raising and lowering of said implement hitch, and a differential drive assembly for the tractor drive wheels including a carrier adapted to be rotatably driven from the tractor engine, a pair of alined drive members rotatable about a common axis with said carrier, a planet gear rotatably mounted on said carrier, and gears fixed in the respective drive members meshing with said planet gear, the combination comprising locking mechanism operative to stop the differential action of said drive assembly, an auxiliary pressure fluid operated actuator for operating said locking mechanism, conduit means connecting said auxiliary actuator with the conduit means connecting to the main hydraulic actuator of the tractor, said conduit means including a control valve having a second manually shiftable control element effective upon movement to different positions to connect and disconnect said auxiliary actuator to said main actuator, means by which said first and second control elements may be moved in unison to energize said auxiliary actuator when the implement hitch is lowered and to deenergize said auxiliary actuator when the hitch is raised, said auxiliary actuator being operable by the pressure created in the main actuator by the load sustained thereby.

11. In a tractor having an implement hitch, a main hydraulic actuator for moving the hitch and implement vertically and for supporting the weight of the same, a source of pressure fluid, conduit means selectively connecting said source and main actuator, and a first manually shiftable control member for causing raising and lowering of said hitch, a differential drive assembly powered by the tractor engine and operative on the tractor drive wheels, a clutch operative to selectively lock elements of said drive assembly to thereby stop differential action of the latter, an auxiliary hydraulic actuator for said clutch, conduit means including a control valve for selectively connecting said auxiliary actuator to be operated by fluid pressure in said main actuator, said control valve having a second manually shiftable control member movable in unison with said first member to lock said clutch when the hitch is lowered and unlock said clutch when the hitch is raised.

12. In a tractor, the combination comprising an elevatable power actuated implement hitch and a first control member manually shiftable between first and second positions for respectively effecting raising and lowering of the hitch, a differential drive assembly powered from the tractor engine and operative on the tractor drive wheels, means for selectively locking said drive assembly to stop differential action, a second control member manually shiftable between first and second positions for respectively engaging and disengaging said locking means, and means connecting said first and second control members for assuring that said second member is moved to its first position whenever said first member is moved to its first position.

13. The combination set forth in claim 12 in which the means connecting said first and second control members are selectively adjustable between effective and ineffective positions.

14. In a tractor, the combination of a power elevatable implement hitch, a first manual control lever movable to a first position for raising said hitch and to a second position for lowering said hitch, a differential drive assembly powered from the tractor engine and drivingly connected with the tractor drive wheel axles, clutch means for selectively locking said drive assembly to stop differential action, a second control lever movable to a first position for disengaging said clutch means and to a second position for engaging said clutch means, and means for positively connecting said first and second levers to be moved in unison to their first and second positions, whereby differential action takes place when said hitch is raised and differential action is stopped when said hitch is lowered.

15. The combination set forth in claim 14 further characterized in that said positive connecting means is selectively disengageable to render said first and second levers independently movable.

16. In a tractor, the combination of a power elevatable implement hitch and a first control lever rotatable about an axis between first and second arc ranges for raising and lowering the hitch, a differential drive assembly interposed between the tractor engine and the two tractor drive wheels, clutch means selectively engageable to stop differential action of said assembly, a second control lever rotatable about the same axis as said first lever between the same first and second arc ranges for disengaging and engaging said clutch means, and an abutment member pivotally carried by one of said levers and selectively positionable in the swinging path of the other lever to thereby move said second lever into its first arc range whenever said first lever is moved into its first arc range, whereby said clutch means are disengaged when said hitch is raised.

17. In a tractor, the combination of a power elevatable implement hitch including a first control lever rotatable about a first axis between first and second angular positions to respectively raise and lower the hitch, a differential drive assembly interposed between the tractor engine and drive wheels, selectively engageable locking means for stopping differential action of said assembly, a second control lever rotatable about a second axis parallel to said first axis and between first and second angular positions to respectively engage and disengage said locking means, releasable means connecting said levers to rock in unison including a link pivoted to one lever and a spring biased detent connecting said link to the other lever, whereby said levers may be moved as one to engage said locking means when said hitch is lowered and to disengage said locking means when said hitch is raised.

18. In a tractor, the combination of a power elevatable implement hitch, a first control lever swingable about an axis between first and second positions to respectively raise and lower said hitch, a differential drive assembly interposed between the tractor engine and drive wheels, clutch means selectively engageable to lock said assembly and stop differential action, a second control lever for said clutch means, said second lever being disposed in parallel relation to said first lever and rotatable about the same axis between the same first and second rotational positions to respectively disengage and engage said clutch means, and a releasable detent carried by one of said levers and spring biased into locking engagement with the other of said levers, whereby said levers are moved in unison to engage said clutch means when said hitch is lowered and to disengage said clutch means when said hitch is raised.

19. In a tractor, the combination of a power elevatable implement hitch including a first control lever rotatable about a first axis between first and second angular positions to respectively raise and lower the hitch, a differential drive assembly interposed between the tractor engine and drive wheels, selectively engageable locking means for stopping differential action of said assembly, a second control lever rotatable about a second axis parallel to said first axis and between first and second angular positions to respectively engage and disengage said locking means, releasable means connecting said levers to rock in unison including telescoping links pivoted at opposite ends to the respective levers and including means for locking said links against relative axial movement, whereupon said levers may be moved as one.

References Cited in the file of this patent

UNITED STATES PATENTS

| | | | |
|---|---|---|---|
| 506,517 | Leibert | Oct. 10, | 1893 |
| 529,264 | Harden | Nov. 13, | 1894 |
| 1,632,417 | Roebel | June 14, | 1927 |
| 2,137,249 | Sanford, et al. | Nov. 22, | 1938 |
| 2,231,858 | Domina | Feb. 11, | 1941 |
| 2,323,859 | Wheatley | July 6, | 1943 |
| 2,349,257 | Evans, et al. | May 23, | 1944 |
| 2,368,156 | Orelind et al. | Jan. 30, | 1945 |
| 2,455,727 | Bunting | Dec. 7, | 1948 |
| 2,459,870 | Cook | Jan. 25, | 1949 |
| 2,507,767 | Castor et al. | May 16, | 1950 |
| 2,538,143 | Brown | Jan. 16, | 1951 |